(12) United States Patent
Richardson

(10) Patent No.: US 8,324,999 B2
(45) Date of Patent: Dec. 4, 2012

(54) HIGH FREQUENCY TRANSFORMER FOR HIGH VOLTAGE APPLICATIONS

(75) Inventor: Robert Richardson, Chelmsford (GB)

(73) Assignee: E2V Technologies (UK) Limited, Chelmsford, Essex (GB)

( * ) Notice: Subject to any disclaimer, the term of this patent is extended or adjusted under 35 U.S.C. 154(b) by 0 days.

(21) Appl. No.: 12/593,136

(22) PCT Filed: Mar. 19, 2008

(86) PCT No.: PCT/GB2008/000980
§ 371 (c)(1),
(2), (4) Date: Jan. 11, 2010

(87) PCT Pub. No.: WO2008/119935
PCT Pub. Date: Oct. 9, 2008

(65) Prior Publication Data
US 2010/0231341 A1 Sep. 16, 2010

(30) Foreign Application Priority Data
Mar. 29, 2007 (GB) .................. 0706197.1

(51) Int. Cl.
*H01F 27/28* (2006.01)
*H01F 27/24* (2006.01)

(52) U.S. Cl. ...................... 336/180; 336/212
(58) Field of Classification Search .......... 336/200, 336/223, 232, 180, 212; 363/15, 21.06, 21.16, 363/68, 69, 70, 71
See application file for complete search history.

(56) References Cited

U.S. PATENT DOCUMENTS

| | | | | |
|---|---|---|---|---|
| 2,600,057 A | * | 6/1952 | Kerns | 336/172 |
| 2,792,547 A | * | 5/1957 | Horton et al. | 323/337 |
| 3,016,342 A | * | 1/1962 | Kruskal et al. | 376/133 |
| 3,195,038 A | * | 7/1965 | Fry | 323/343 |
| 3,363,165 A | * | 1/1968 | Wilkinson | 363/68 |
| 3,368,137 A | * | 2/1968 | Stevens et al. | 363/82 |
| 3,437,965 A | * | 4/1969 | Ragsdale | 336/61 |
| 3,440,384 A | * | 4/1969 | Schroeder | 219/624 |
| 3,568,035 A | | 3/1971 | Pierson et al. | |
| 3,745,440 A | | 7/1973 | Lord | |
| 3,919,595 A | * | 11/1975 | Willis, Jr. | 315/257 |
| 4,016,477 A | * | 4/1977 | Ghiringhelli | 363/64 |
| 4,339,704 A | * | 7/1982 | McSparran et al. | 322/90 |
| 4,739,296 A | * | 4/1988 | Fukatsu | 336/62 |
| 4,779,035 A | | 10/1988 | Engelmann | |

(Continued)

FOREIGN PATENT DOCUMENTS

DE 10100829 5/2002

(Continued)

OTHER PUBLICATIONS

International Search Report of PCT/GB2008/000980 dated Jul. 4, 2008.

(Continued)

*Primary Examiner* — Elvin G Enad
*Assistant Examiner* — Joselito Baisa
(74) *Attorney, Agent, or Firm* — Venable LLP; Robert Kinberg

(57) ABSTRACT

A transformer comprises a primary winding having a first plurality of magnetic circuits each with a second plurality of turns and electrically connected in parallel and a secondary winding comprising a third plurality of magnetic circuits each with a fourth plurality of turns and electrically connected in series. The primary winding is electromagnetically coupled to the secondary winding by a single turn electrically conductive loop.

22 Claims, 11 Drawing Sheets

U.S. PATENT DOCUMENTS

| | | | |
|---|---|---|---|
| 4,956,626 A * | 9/1990 | Hoppe et al. | 336/60 |
| 5,023,768 A * | 6/1991 | Collier | 363/68 |
| 5,166,965 A * | 11/1992 | Collier | 378/101 |
| 6,255,783 B1 * | 7/2001 | Parker | 315/219 |
| 6,377,153 B1 | 4/2002 | Yamanaka et al. | |
| 6,788,184 B2 * | 9/2004 | Roche | 336/212 |
| 6,909,352 B2 * | 6/2005 | Hobson et al. | 336/178 |
| 7,009,853 B2 * | 3/2006 | Nagel et al. | 363/17 |
| 7,015,784 B2 * | 3/2006 | Kohno | 336/170 |
| 7,042,323 B2 * | 5/2006 | Joerg et al. | 336/184 |
| 7,129,813 B2 * | 10/2006 | Kohno | 336/170 |
| 7,294,971 B2 * | 11/2007 | Jin | 315/177 |
| 7,318,270 B1 * | 1/2008 | O'Loughlin | 29/605 |
| 7,332,992 B2 * | 2/2008 | Iwai | 336/170 |
| 7,447,048 B2 * | 11/2008 | Yasumura | 363/21.02 |
| 7,652,551 B2 * | 1/2010 | Buswell | 336/229 |
| 7,705,705 B2 * | 4/2010 | Zeng et al. | 336/212 |
| 2008/0024261 A1 | 1/2008 | Shinmen et al. | |

FOREIGN PATENT DOCUMENTS

| | | |
|---|---|---|
| EP | 1814129 A1 | 8/2007 |
| GB | 427948 | 5/1935 |
| JP | 63-088811 A | 4/1988 |
| JP | 05-243060 A | 9/1993 |
| JP | 11176678 | 7/1999 |
| JP | 2000-260640 A | 9/2000 |
| JP | 2001-068359 A | 3/2001 |
| JP | 2002-083718 A | 3/2002 |
| JP | 2006-013094 A | 1/2006 |
| JP | 2006-147885 A | 6/2006 |

OTHER PUBLICATIONS

Partial English Translation of a Japanese Office Action dated Jul. 30, 2012, issued in counterpart Patent Application No. 2010-500346.

* cited by examiner

HIGH FREQUENCY TRANSFORMER FOR HIGH VOLTAGE APPLICATIONS

CROSS REFERENCE TO RELATED APPLICATIONS

This application is derived from international patent application PCT/GB2008/000980 and claims priority from GB 0706197.1 filed Mar. 29, 2007.

BACKGROUND OF THE INVENTION

This invention relates to a high frequency transformer for high voltage applications.

SUMMARY OF THE INVENTION

According to the invention there is provided a transformer comprising primary winding means comprising a first plurality of magnetic circuits each with a second plurality of turns and electrically connected in parallel or each powered with respective power supply means; and secondary winding means comprising a third plurality of magnetic circuits each with a fourth plurality of turns and electrically connected in series; wherein the primary winding means are electromagnetically coupled to the secondary winding means by single turn electrically conductive loop means.

Conveniently, the primary winding means and secondary winding means are coaxial.

Advantageously, at least one of the magnetic circuits of the secondary winding means is provided with rectifier means and filter means to provide a DC output from the transformer.

Conveniently, at least one of the magnetic circuits of the secondary winding means is further provided with inductive smoothing filter means.

Advantageously, the inductive smoothing filter means is a double wound inductor.

Conveniently, the inductive smoothing filter means for each of the third plurality of magnetic circuits have a common core.

Advantageously, the transformer further comprises inductance means in the single turn electrically conductive loop means.

Conveniently, the single turn electrically conductive loop means comprises tube means coaxial with the primary winding means and secondary winding means.

Preferably, the single turn electrically conductive loop means further comprises formed conductive end cheek means and base means.

Advantageously, the formed conductive end cheek means are provided with at least one aperture for passing cooling fluid therethrough.

Conveniently, each of the first plurality of magnetic circuits, each of the plurality of second magnetic circuits, the rectifier means and the filter means are mounted on respective printed circuit board means.

Advantageously the inductive smoothing filter means is mounted on the respective printed circuit board means.

Alternatively, the primary winding means and the secondary winding means are in side-by-side relationship.

Conveniently, the secondary winding means further comprises extra high tension end insulating means.

Advantageously, the secondary winding means is arranged in two groups of magnetic circuits such that a secondary voltage is tapped substantially from a centre of the secondary winding means between the two groups of magnetic circuits.

Conveniently, screen means is provided between the primary winding means and the secondary winding means.

Advantageously, the smoothing inductive filter cores are provided coaxially with, and internally of, the primary winding means.

Conveniently, the magnetic circuits of the secondary winding means are of decreasing diameter from a high voltage end to a low voltage end of the secondary winding means.

Optionally, the primary winding means are divided into a first group of magnetic circuits and a second group of magnetic circuits and the first and second group are arranged with their respective axes collinear with an axis of the secondary winding means with the first group at a first end of the secondary winding means and the second group at a second end of the secondary winding means opposed to the first end.

Advantageously, a return path of the coupling loop means is formed of a strip wider than a remaining portion of the coupling loop means.

Preferably, at least one of the primary winding means and the secondary winding means comprises single layer windings.

BRIEF DESCRIPTION OF THE DRAWINGS

The invention will now be described, by way of example, with reference to the accompanying drawings in which:

FIG. 2b is a schematic end view of the transformer of FIG. 2a;

FIG. 4b is a schematic end view of the transformer of FIG. 4a;

FIG. 5b is a schematic end view of the transformer of FIG. 5a;

In the Figures, like reference numbers denote like parts.

DETAILED DESCRIPTION OF THE EMBODIMENT

Figure 1A:
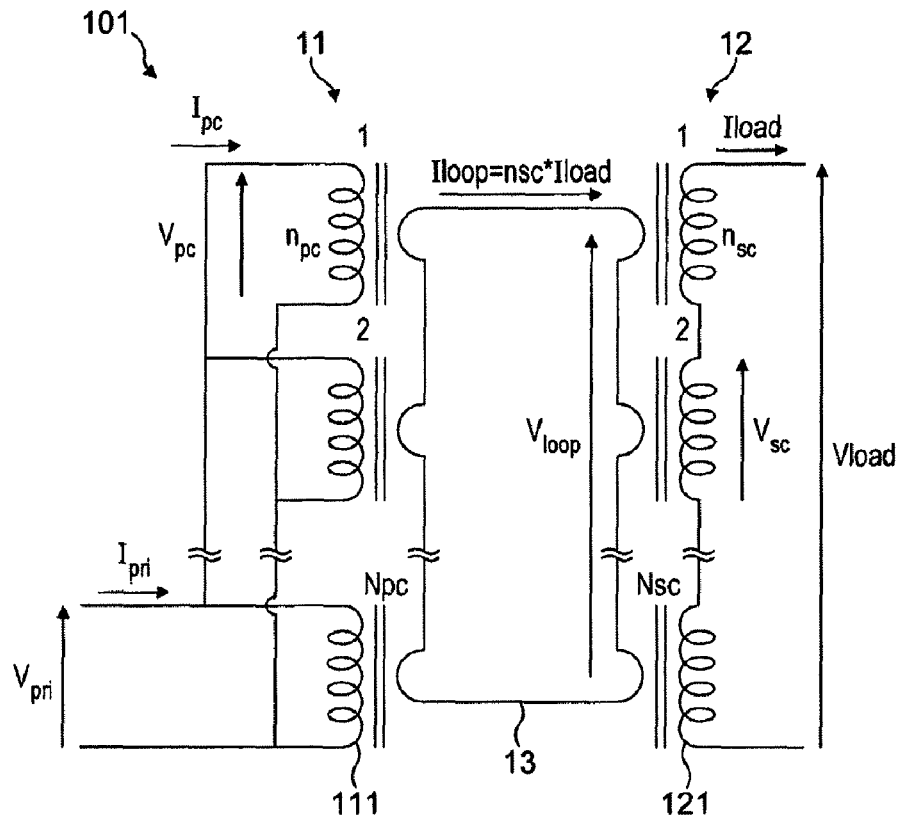
FIG. 1a is a circuit diagram of a first embodiment of a transformer according to the invention.

Transformers have a primary winding and a secondary winding. Referring to a basic circuit of a transformer 101 according to the invention in FIG. 1a, the primary winding 11 comprises a first plurality Npc of magnetic circuits 111 connected in parallel each with an identical number of turns $n_{pc}$. The secondary winding 12 comprises a second plurality Nsc of magnetic circuits 121, which need not be the same number as Npc which are connected in series, each of which has a number of turns $n_{sc}$.

All the primary and secondary magnetic circuits 111, 121 are linked by a single turn low resistance loop 13 which electromagnetically couples them together.

The compound assembly 101 has the following relationships between the primary and secondary voltages and currents.

For a voltage step up ratio from primary to secondary $$Vload = Nsc \cdot V_{sc}$$

where Vload is a total voltage across the Nsc secondary turnings 12 and $V_{sc}$ is a voltage across each secondary turning 12
and $$Vloop = V_{pri} \cdot \frac{Npc}{n_{pc}} = V_{sc} \cdot \frac{Nsc}{n_{sc}}$$

where Vloop is a voltage across the single turn low resistance loop 13, and $V_{pri}$ is a voltage across each of the primary turnings 111 in parallel
therefore substituting for $V_{sc}$ $$V_{pri} \cdot \frac{Npc}{n_{pc}} = \frac{Vload}{Nsc} \cdot \frac{Nsc}{n_{sc}}$$

and thus $$\frac{Vload}{V_{pri}} = Npc \cdot \frac{n_{sc}}{n_{pc}}$$

For the Current Ratio from Secondary to Primary $$Iloop = n_{sc} \cdot Iload = n_{pc} \cdot I_{pc}$$

where Iloop is a current in the single turn low resistance loop 13, Iload is a current in the secondary windings 121 and $I_{pc}$ is a current in each of the primary windings 111.
and $$I_{pri} = Npc \cdot I_{pc}$$

where $I_{pri}$ is a sum of the currents in the Npc primary turnings 111 therefore, substituting for $I_{pc}$ $$n_{sc} \cdot Iload = n_{pc} \cdot \frac{I_{pri}}{Npc}$$

and thus $$\frac{Iload}{I_{pri}} = \frac{n_{pc}}{n_{sc} \cdot Npc}$$

Thus, it can be seen that, as would be expected from a known transformer:

$$\frac{Vload}{V_{pri}} = \frac{I_{pri}}{Iload}$$

The ratios are independent of a number Nsc of secondary windings or cores 121. Other known transformer rules apply such as impedance transformations and shunt inductances as they would for any transformer.

Thus in effect the circuit diagram of FIG. 1a represents a transformer with a number of multiple magnetic circuits.

Figure 1B:
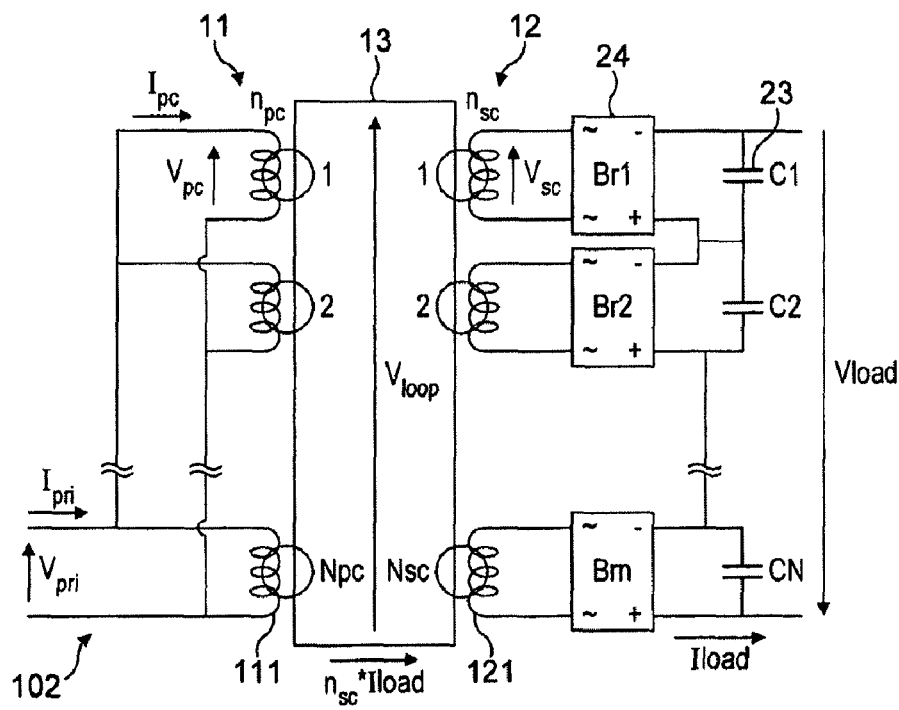
FIG. 1b is a circuit diagram of a second embodiment of a transformer according to the invention including rectifiers and filters.

Referring to FIG. 1b, a transformer 102 is illustrated similar to the transformer 101 illustrated in FIG. 1a, but in which each of the Nsc secondary windings 121 is provided with a respective $Br_{1-n}$, rectifier 24 and a $C_{1-n}$, filter 23 respectively, so that the transformer 102 output is rectified to provide a DC output.

This is a well known and most effective way to meet a high voltage DC requirement. Semiconductor diodes are efficient rectifiers for such an application but are each limited to a maximum voltage of, for example, approximately 2000V. Thus for a 30 kV system at least 15 would be required. By providing an individual winding 121 for each diode 24 sharing occurs naturally, and a need for complex and lossy networks to ensure sharing is avoided.

It will be understood that a further benefit is that many of the stray capacitances that are inevitable within the transformer structure are charged to fixed DC voltages rather than being subject to alternating voltages at high frequencies. This reduces dynamic capacitance and lowers dielectric related losses.

Thus an advantage of the multiple core 121 transformer described is that the transformer ideally lends itself to a multiple rectifier 24 approach. In high voltage applications, where many semiconductor devices must be used to obtain a suitable voltage rating, a risk of failure of components must be considered. With the multiple core approach of the present invention, a short circuit failure shorts out only a single core thus the system can continue to operate with the remaining cores until a suitable service interval for shut down and repair is reached. This is a very valuable characteristic in regard to reliability. With a traditional transformer, rectifier failure of a single rectifier can shut down an entire system.

Figure 1C:
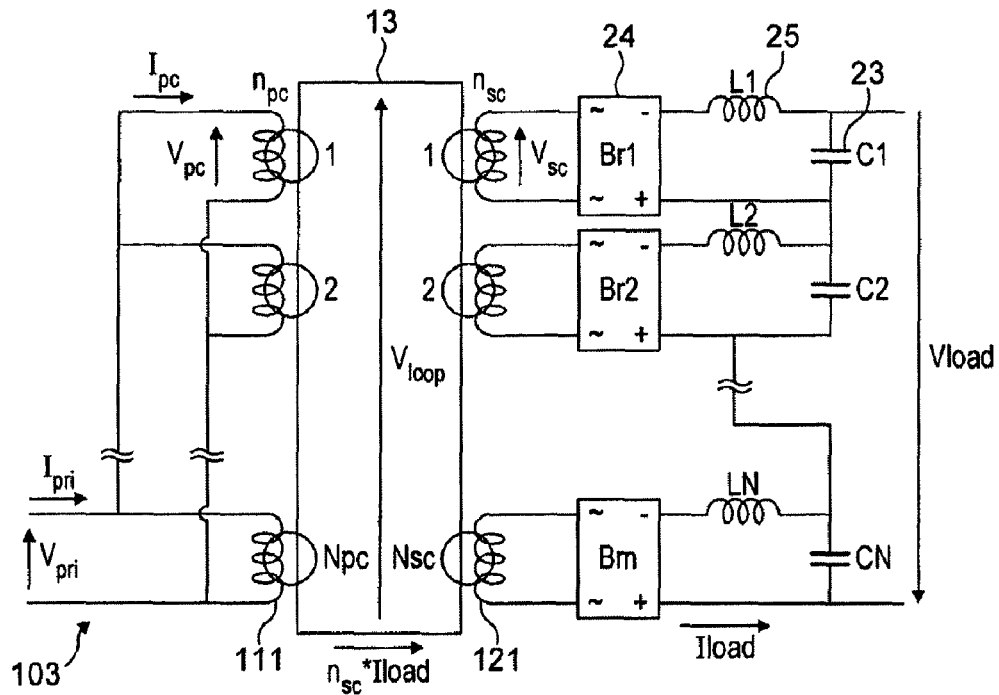
FIG. 1c is a circuit diagram of a third embodiment of a transformer according to the invention including rectifiers and filters.

FIG. 1c shows a circuit diagram of a transformer 103 according to a third embodiment of the invention using $L_{1-N}$ inductive smoothing filters 25 in an output circuit of each of the secondary coils 121, which adaptation is well known in the art.

Figure 1D:
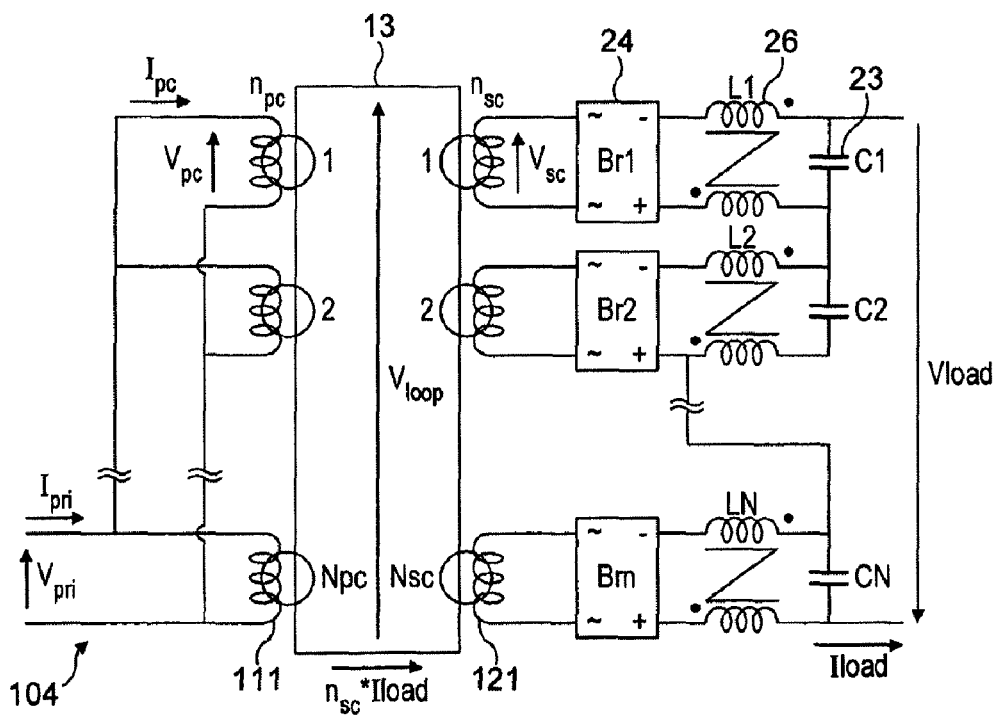
FIG. 1d is a circuit diagram of a fourth embodiment of a transformer including rectifiers and filters according to the invention including rectifiers and filters.

FIG. 1d shows a circuit diagram of a fourth embodiment 104 with $L_{1-N}$ double wound inductors 26 in place of the inductive smoothing filters 25, which further aid in reduction of stray capacitance effects described earlier herein, as portions of the individual choke structures 26 have DC voltages between the windings and not alternating voltage.

Figure 1E:
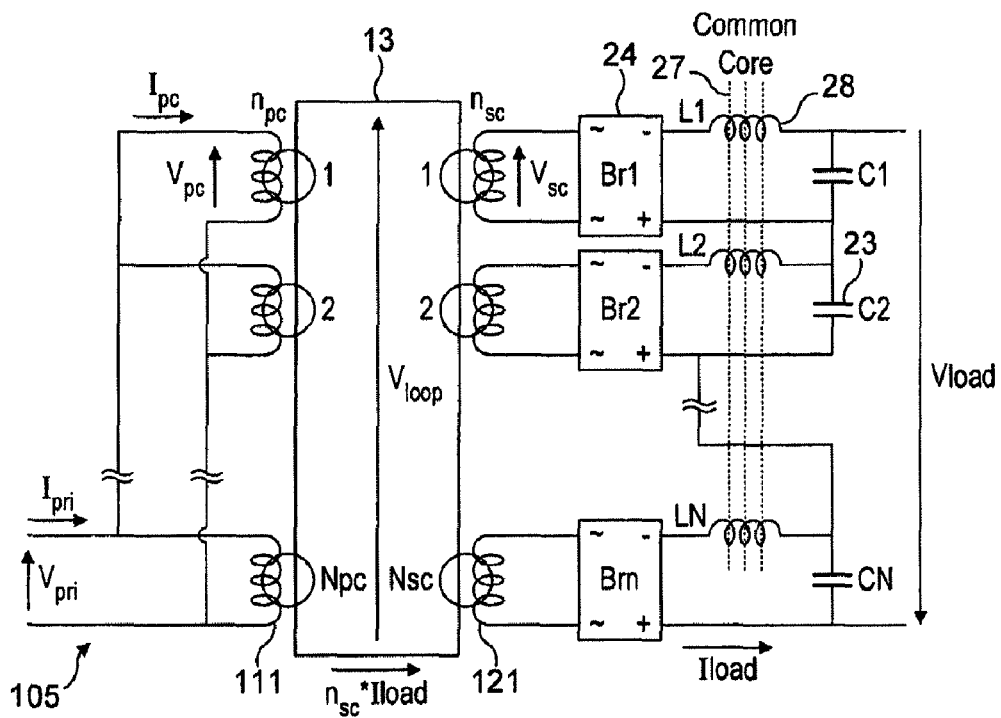
FIG. 1e is a circuit diagram of a fifth embodiment of a transformer according to the invention including rectifiers and filters.

In FIG. 1e a circuit diagram of a fifth embodiment 105 is illustrated which uses a common magnetic core 27 through all of the inductive smoothing filter single wound windings 28 similar to those of the third embodiment, and this is further discussed later herein in relation to assembly techniques.

Figure 1F:
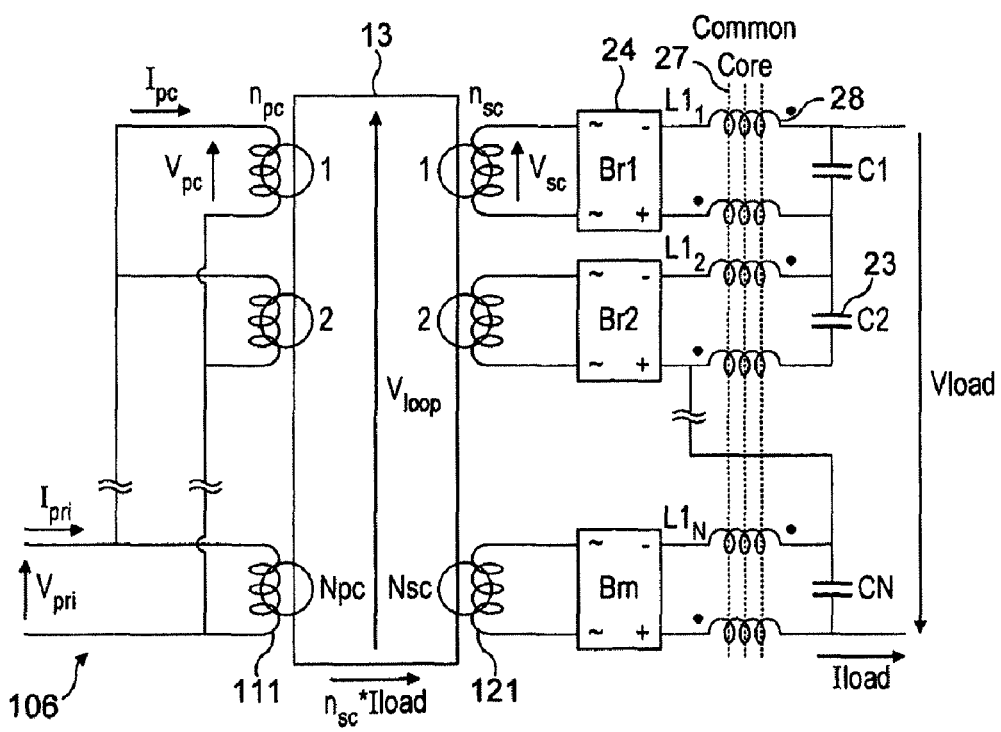
FIG. 1f is a circuit diagram of a sixth embodiment of a transformer according to the invention including rectifiers and filters.

Similarly, in FIG. 1f a circuit diagram of a sixth embodiment 106 is illustrated which uses a common magnetic core 27 through all of the inductive smoothing filter double wound windings 29 similar to those of the fourth embodiment.

Figure 1G:
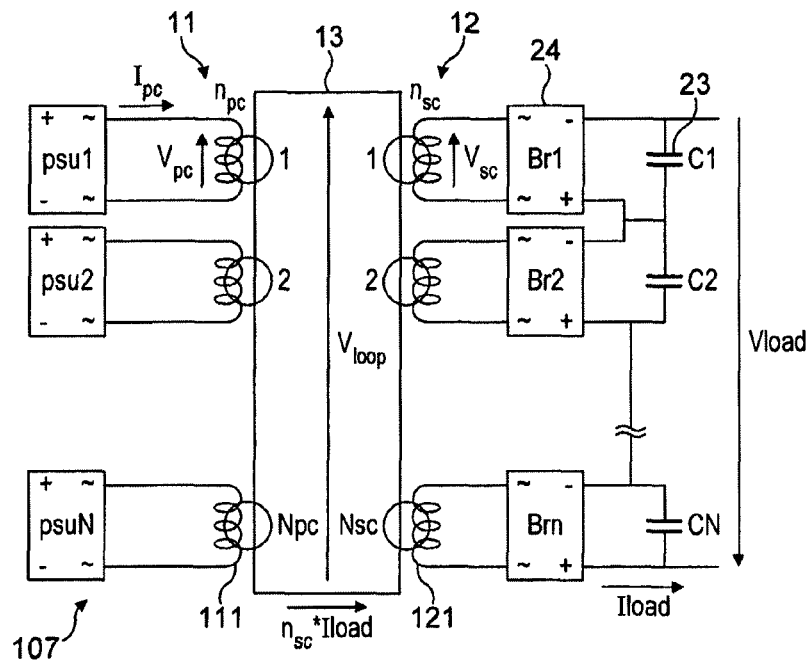
FIG. 1g is a circuit diagram of a seventh embodiment of a transformer according to the invention, wherein each of the first plurality of magnetic circuits is powered by respective power supply units.

FIG. 1g is a circuit diagram of a seventh embodiment 107 in which instead of connecting all the primaries 111 in parallel each primary winding is powered by a respective power supply 29, psu1 to psuN.

Each power supply unit 29 is suitably designed so that the power supply units behaves as a relatively low impedance to the loop and the remaining power supplies make up a required power input, so that overall performance of the system is not adversely affected if one power supply unit fails.

Alternatively, a spare power supply unit 29 is installed in the system and powered up only when one of the other power supply units fails.

All the power supply units are operated with a symmetrical AC output with a suitable phase to add, operate with a common output current, and are synchronised. Small voltage variations in $V_{pc}$ between each of the power supply units modules can be tolerated and the total voltage $V_{loop}$ is the sum of all the individuals $V_{pc}$ outputs.

The power supply units all operate in parallel from a DC link with all positive poles connected in parallel and all negative poles in parallel.

Many alternative implementations of power supply unit can be employed which are well known to those skilled in the art.

Figure 2A:
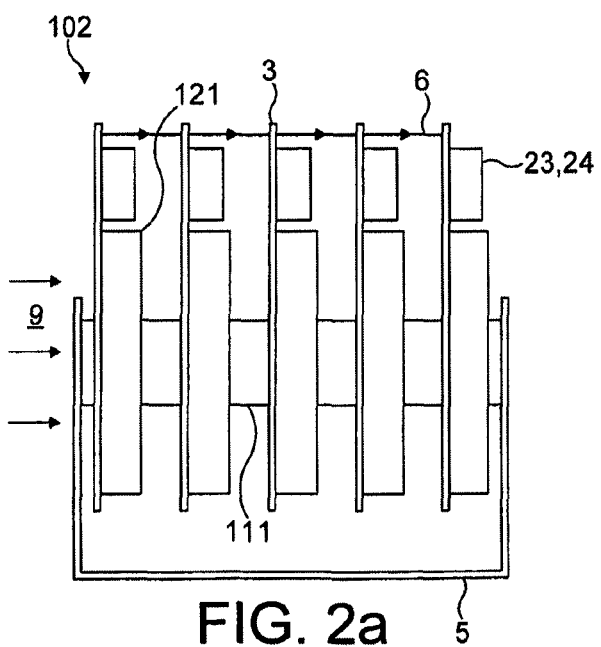
FIG. 2a is a schematic side view of a transformer having the circuit diagram of FIG. 1b.
Figure 2B:
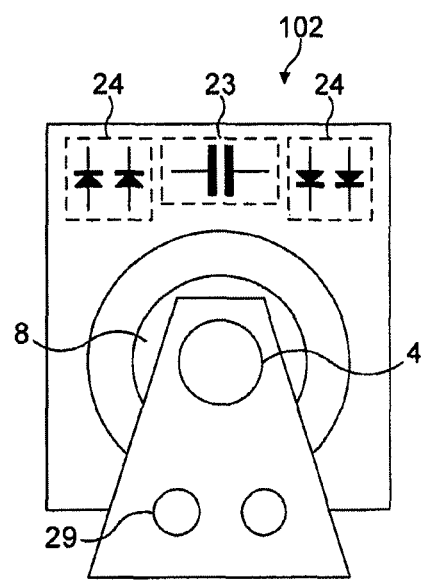

A realisation of the circuit diagram shown in FIG. 1b of the second embodiment 102 of the invention is shown in FIGS. 2a and 2b, in which primary toroids 111 at low voltage are located coaxially with, and at least partially within, secondary toroids 121 operated at high voltage, as illustrated in Example 1 herein. A key advantage of this system is that voltage insulation requirements are between structures that have large diameters and reasonably smooth surfaces. This is ideal because as voltages rise it is important to avoid sharp points that cause significantly sharp field enhancements that can lead to failure by voltage breakdown.

Figure 3:
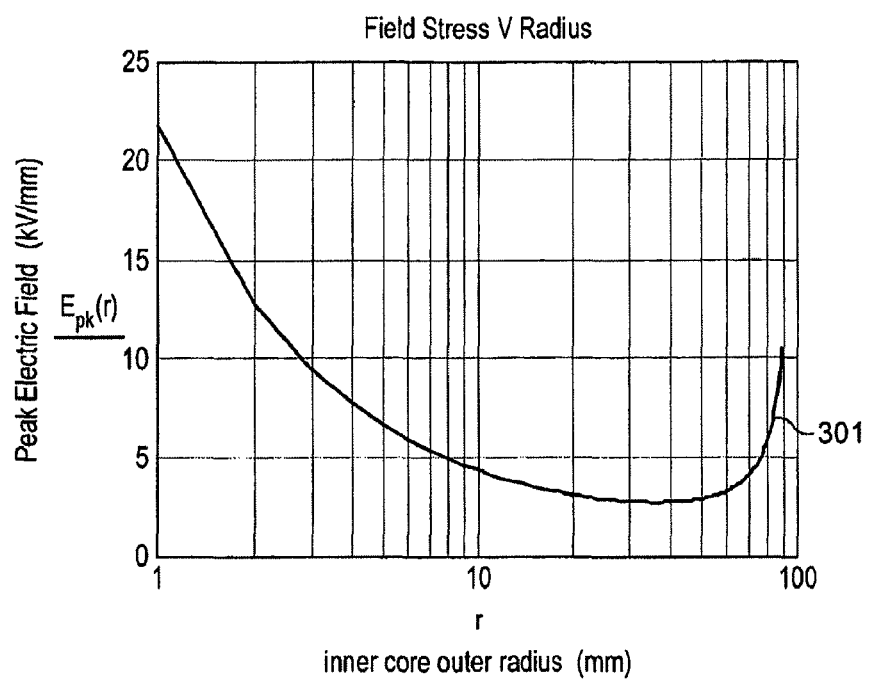
FIG. 3 is a graph of field stress vs. radius of an inner core radius for a fixed radius of an outer core of the transformer of FIGS. 2a and 2b.

As voltage increases what is considered a "sharp point" becomes important. Referring to FIG. 3, Epk is a peak electric field, V=100 kV is a voltage between the inner toroid 111 of outer diameter r and the outer toroid 121 of inner diameter R=100 mm $V := 100$ $R := 100$ $r := 1, 2 \ldots 90$ $E_{pk}(r) := \dfrac{V}{r \cdot \ln\left(\dfrac{R}{r}\right)}$ This function is plotted by line 301 in FIG. 3 for a constant radius R=100 mm of the larger toroid 121. It will be noted that for very small radius r of the smaller toroid 111, although a distance between the toroids is larger than for larger values of r, the electric field rises to quite high values. Not unexpectedly if r tends towards R, then the electric field again rises as the surfaces become closer. For the given value of R=100 mm a minimum electric field stress occurs when r=37 mm and the resultant field stress of 2.72 kV/mm is only just below a breakdown value for dry air of around 3 kV/mm at normal temperature and pressure. A key advantage of the invention is an ability, for a given voltage, to select radii r and R for electric field minimisation.

Sizes of the toroidal cores 111, 121 are preferably selected such that a required winding for both the primary cores 111 and secondary cores 121 can be achieved with a single layer winding. This is most desirable but is not essential and multi-layer windings could be used. An advantage of a single layer winding is that eddy current losses in the wires are minimised as layers can otherwise compound eddy current loss to a very high degree. Also as a voltage on an individual core is low, the winding can be placed directly on a plastic finish that is usually found on the toroid core. The apparatus requires no further complex insulation systems between the core and the winding. Also with a single layer winding the actual winding operation of putting a single layer winding on a toroid is one of the simplest and lowest cost processes in transformer winding.

A choice of materials for the core, an operating frequency, and individual core dimensions are determined by calculations for each individual core based upon load, and Vloop. In this regard standard methods of calculation, assuming each individual toroid has a single turn winding, are applied. It may be expected that the benefits of the apparatus will be relevant when the core material is ferrite or nanocrystalline material.

Referring again to FIGS. 2a and 2b, there is illustrated assembly 102 with five individual secondary toroids 121 as an example but another number, even as many as 30 or 40 toroids could be used.

Each secondary coil 121 is mounted on a printed circuit board 3 on which the Brn rectifiers 24 and the CN filter capacitors 23 are also mounted.

There is a small space between individual circuit boards 3 for voltage isolation. As the secondary coils 121 are connected in series small connector systems 6 can be used so that the PCB's can be plugged together to ease assembly. The loop voltage is much lower and so the primary coils 111 can be closer together than the secondary coils, maybe even touching. A radial space 8 between the primary coils 111 and the secondary coils 121 is shown in the end view of FIG. 2b and can be designed for a required voltage hold off as detailed earlier herein.

The loop 13 that links all the cores is formed by a central conductive tube 4 passing axially through the primary and secondary coils and by formed conductive end cheeks and base 5. The system can be immersed in a fluid for cooling and for voltage hold off enhancement requirements by known methods.

Where the system is to be used at high frequencies where current penetration depth will be low, for example, approximately 0.46 mm at 20 kHz in copper, the use of a thin walled tube 4 and a flat structure with a high surface area for the end cheeks and base is most appropriate. For the central conductor 4 multiple small tubes and/or a slot down the length of the tube may also improve current distribution and lower AC resistance of the tube, which is desirable.

Apertures 29 may be located in the end cheek 5 so that, as shown in FIG. 2a, fluid flow 9 can be directed thorough the assembly if required for cooling the transformer.

Figure 4A:
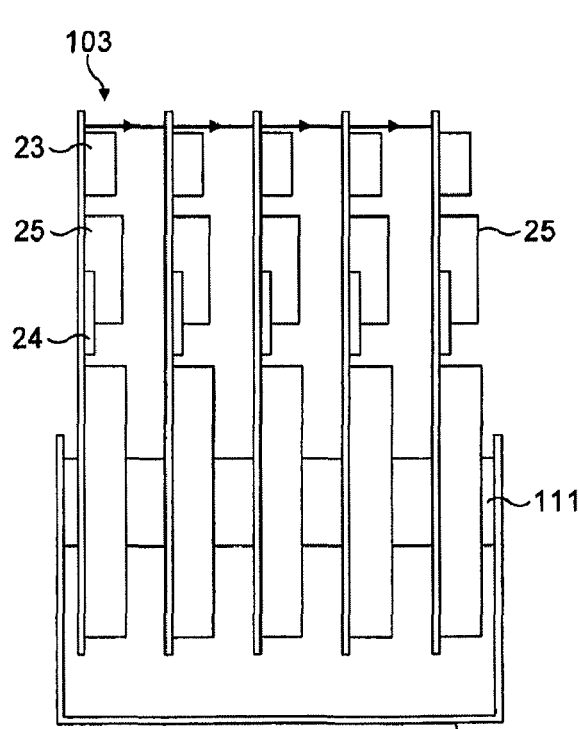
FIG. 4a is a schematic side view of a transformer having the circuit diagram of FIG. 1c.
Figure 4B:
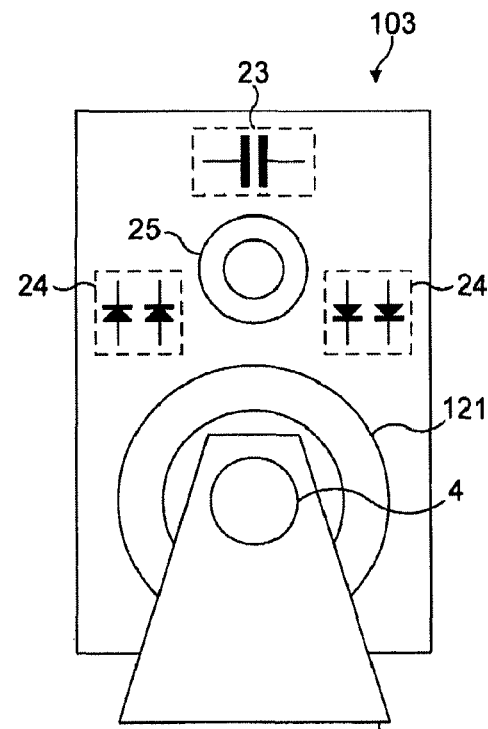

FIGS. 4a and 4b show a system 103 where the PCBs 3 have added the LN inductors 25 shown in FIGS. 1c and 1d.

Figure 5A:
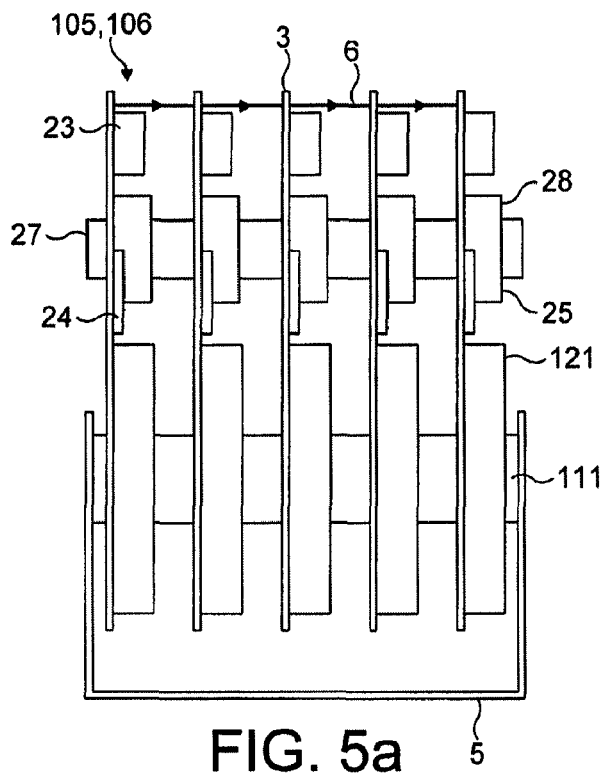
FIG. 5a is a schematic side view of a transformer having the circuit diagram of FIG. 1e.
Figure 5B:
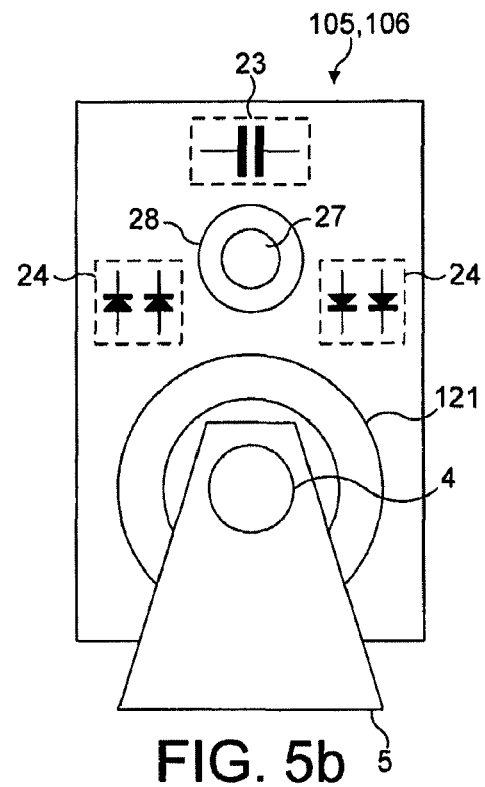
Figure 6:
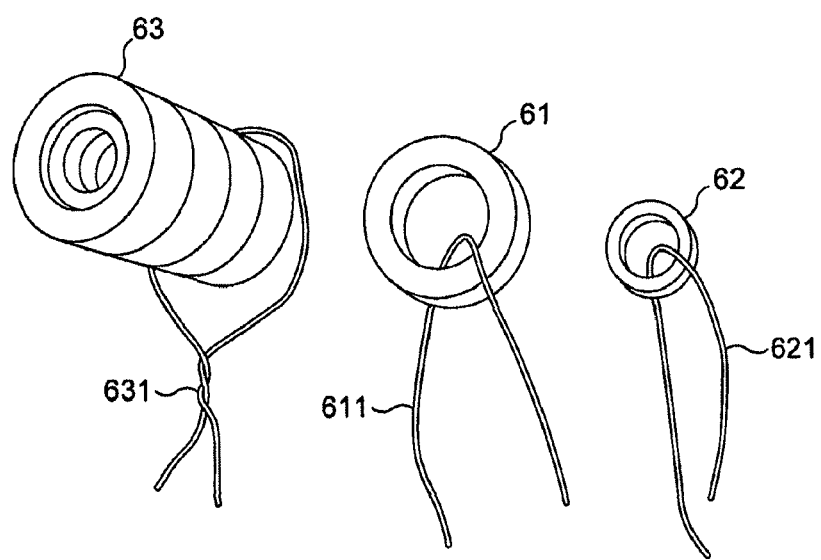
FIG. 6 is a photograph of windings for the transformer of FIGS. 5a and 5b.

FIGS. 5a and 5b show the embodiments 105, 106 of the invention employing the circuits of FIGS. 1e and 1f in which the coils 111, 121 are wound not as toroids but in a conventional form. Then a suitably insulated core, which may be made from an assembly of toroids, one inside the other, may be used as a common magnetic circuit. By placing toroids one inside the other a very large area magnetic circuit can be produced which is ideal for a high current filter application. This type of magnetic circuit is best used with ferrite or iron powder cores that use a particulate form of magnetic material rather than strip wound cores. A photograph of components of the embodiments 105, 106 is shown in FIG. 6. The core 61 shown in the centre of the photograph and the right-hand core 62 each show a wire (winding) 611, 621 respectively passing through the toroid—this is a normal way of using such a core. By placing a group of the smaller cores 62 inside a group of the larger cores 61 a long magnetic core 63 of large area can be made. The wire (winding) 631 passes around an outer diameter of the outer core 61. This arrangement has a large air gap and thus a low μ—most desirable for a DC power supply filter choke. There is no theoretical limit to the number of cores which may be placed inside each other and the height of the stack. This approach is much lower in cost than having a large cylindrical block of ferrite or iron powder manufactured.

As will be known to those skilled in the art, in any transformer, coupling between the primary and secondary is incomplete and this transformer is no exception. However, the imperfection, or leakage inductance as it is usually known, is of a similar order to that obtained with a conventional transformer.

Figure 7:
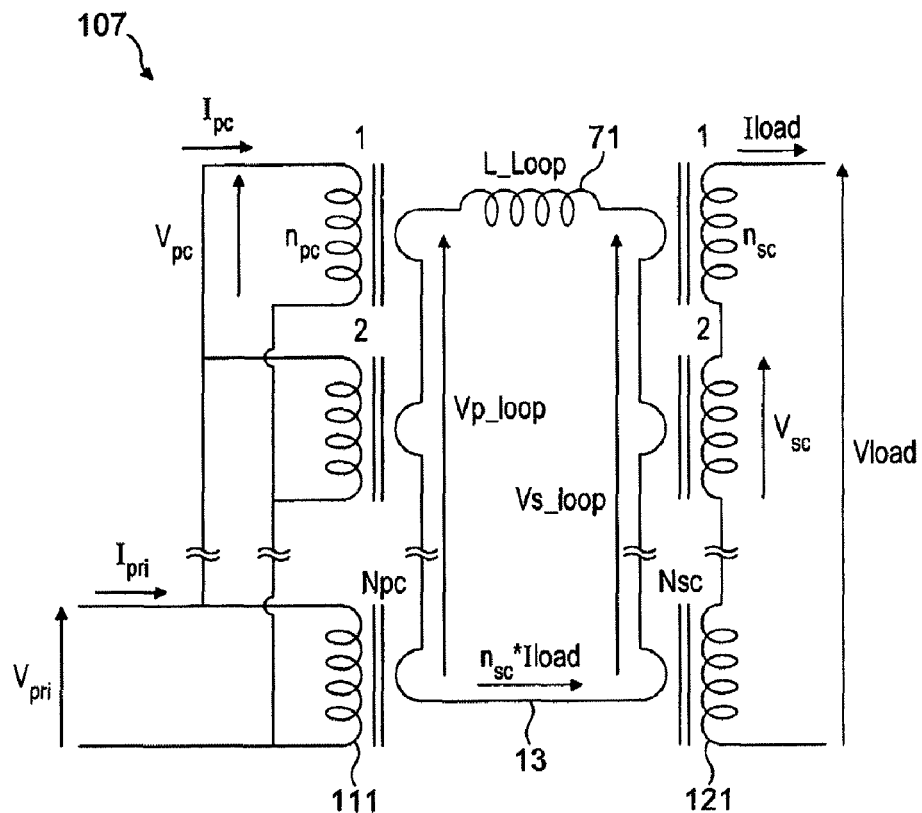
FIG. 7 is a circuit diagram of a seventh embodiment of a transformer according to the invention.

In some transformers it is desirable to have a deliberate leakage inductance and with the transformer of the invention this can be introduced in a most effective manner. FIG. 7 shows a circuit diagram of a seventh embodiment 107 of the invention with a deliberate introduction of an inductance 71 in the loop as L_Loop. Voltages in the loop across the primary Vp_Loop and the secondary Vs_loop that were virtually identical in the basic design are now therefore different and calculations are made by using different values of V_Loop for the primary and secondary coils 111, 121.

Figure 8:
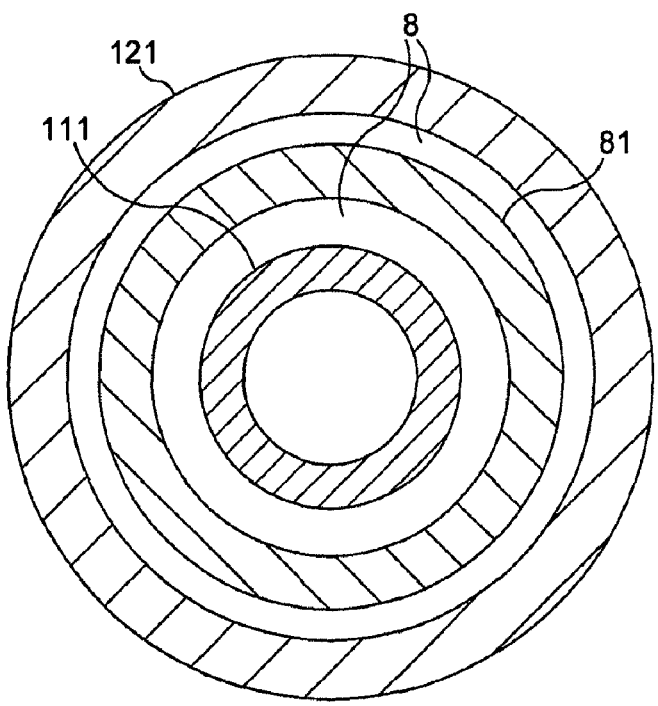
FIG. 8 is a schematic end view of transformer cores and windings of a first embodiment of a transformer having the circuit diagram of FIG. 7.

Referring to the end view of FIG. 8, realisation of L_Loop 71 can be made in a transformer in which the primary and secondary windings are coaxial by inserting magnetic material 81 in a cylindrical space 8 between the primary and secondary coils 111, 121. The insulation spaces 8 must be rated for the voltage hold off required or the magnetic material 81 may be of a type of ferrite that has high hold off voltage capabilities. Certain nickel zinc ferrites can reliably hold off voltage up to 2 kV/mm and so a transformer with leakage inductance using the magnetic material as both the high voltage insulator and the magnetic core can be made.

Figure 9:
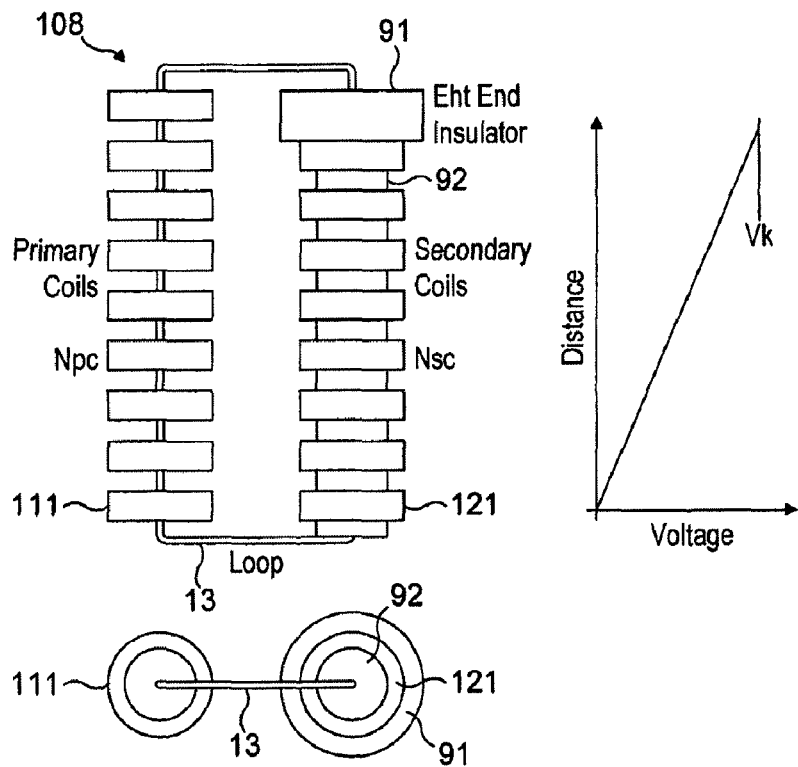
FIG. 9 is a schematic plan and end view of an eighth embodiment of the invention with a plot of voltage along the secondary windings.

Referring to FIG. 9, it will be understood that the coils 111, 121 do not have to be coaxial but may be side by side as shown in an eighth embodiment 108 of the invention. For a high voltage output, which is the case for all of the systems considered here, a linear gradient over the coils will result in the high voltage at one end so that an eht insulator 91 is required. This increases the loop length. It will be noted that the primary coils 111, in this and following descriptions the term "coil" implies a toroid with a winding, have a same diameter; with an eht system the primary coils need less voltage clearance than otherwise.

Figure 10:
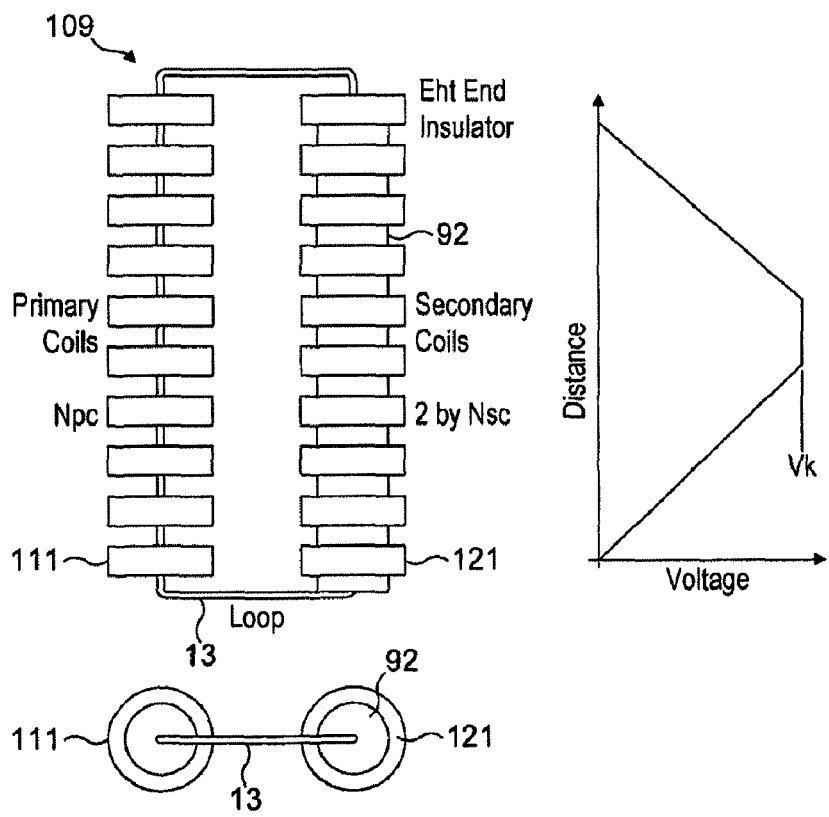
FIG. 10 is a schematic plan and end view of a ninth embodiment of the invention with a plot of voltage along the secondary windings.

Referring to FIG. 10, for higher current applications in a ninth embodiment 109 two groups of secondary coils 121 may be used by arranging the groups so that a high voltage is in a centre of the two groups as shown in the accompanying graph. By using two groups of coils 121 for the secondary winding the high voltage point can be brought out at the centre. This significantly simplifies the eht insulation design and results in a smaller, i.e. shorter, secondary system than in the previous embodiment 108. The parallel secondary coils 121 also increase current capability.

For these embodiments the primary loop tube 4 may have a larger diameter than in previously described embodiments to reduce copper loss if required.

Figure 11:
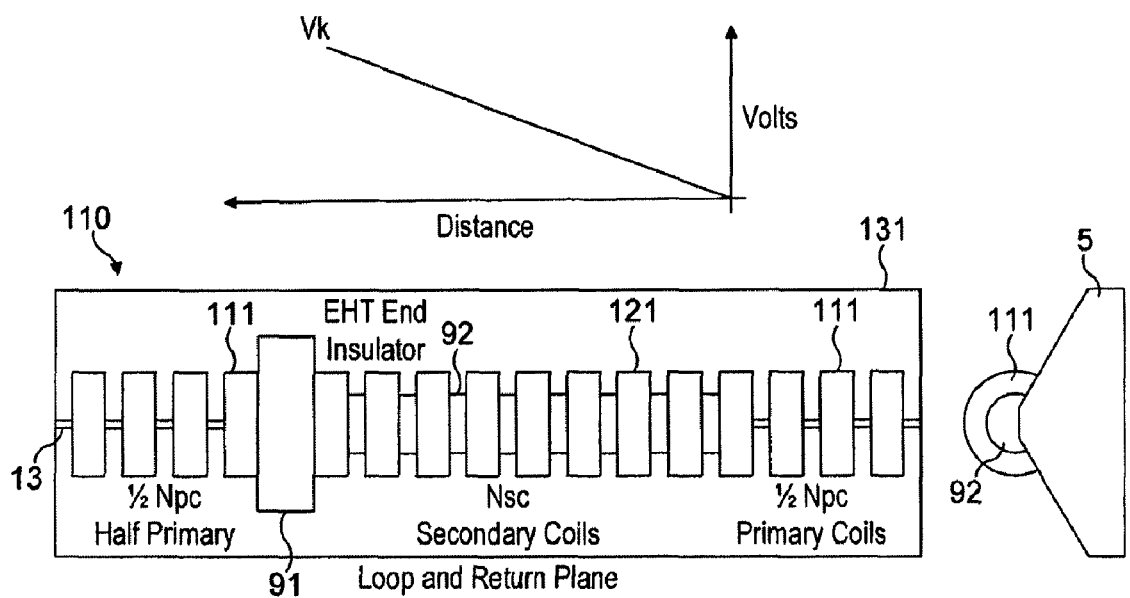
FIG. 11 is a schematic plan and end view of a tenth embodiment of the invention with a plot of voltage along the secondary windings.
Figure 12:
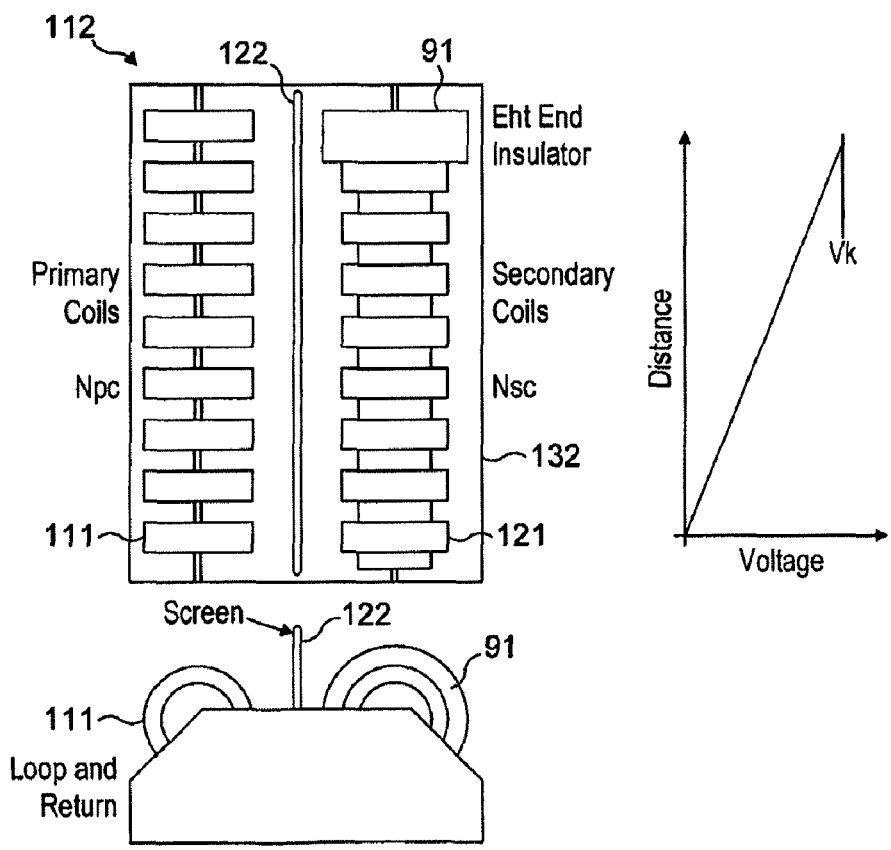
FIG. 12 is a schematic plan and end view of an eleventh embodiment of the invention with a plot of voltage along the secondary windings.

Small modifications to the mechanical arrangement can be made as shown in FIGS. 11 and 12. This is because clearance between the primary coils 111 is usually much less than a required clearance between the secondary coils 121.

Referring to FIG. 11, an apparatus realising the coupling loop 13 may have a design with a linear conductor with the return path formed by a wider, possibly grounded, strip 131. Supporting primary side power electronics may be mounted on an opposite side of the strip from the windings. Water (or air) cooling this strip allows it to form a central mechanical interface for a power electronics system of the converter.

Referring to FIG. 12, the embodiment 110 of FIG. 11 can be adapted to arrangements like that of the eighth embodiment 108 of FIG. 9. This changes an aspect ratio of the apparatus. A wider strip 132 may help reduce resistance slightly, but requires more joins. Connection methods are important with the primary structure and as power/frequency contours rise this may become a weak link. However it now becomes possible to fit a screen 122 between the primary and secondary coil systems 111, 121.

Figure 13:
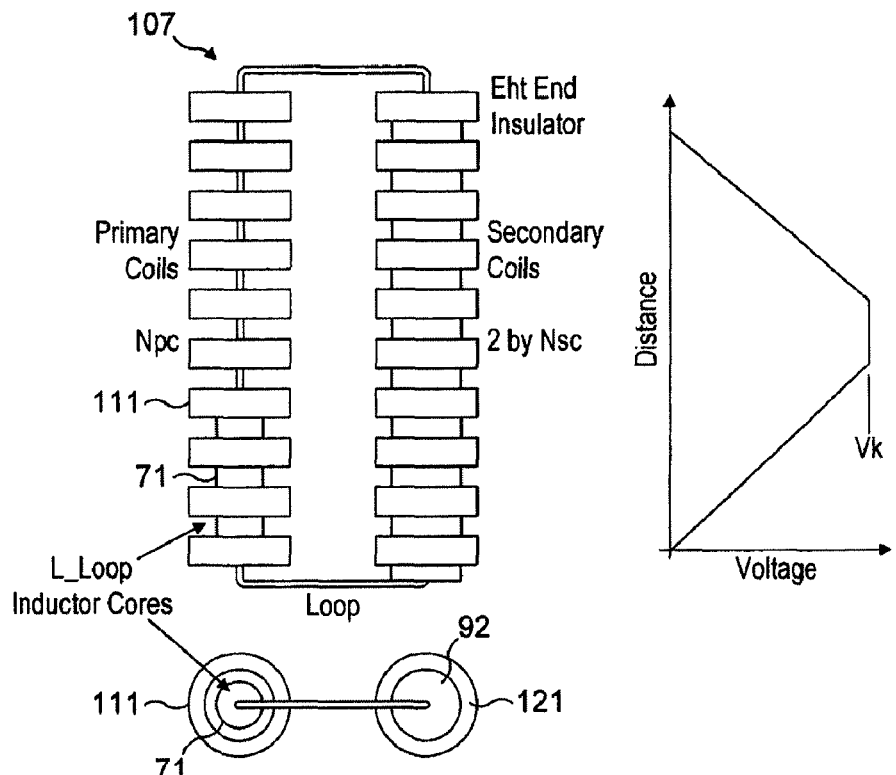
FIG. 13 is a schematic plan and end view of a second embodiment of a transformer having the circuit diagram of FIG. 7, with a plot of voltage along the secondary windings.

Referring to FIG. 13, the circuit shown in FIG. 7 can alternatively be realised by fitting cores 71 on the primary loop, which fit inside the primary coils 111. This produces a same equivalent circuit as in FIG. 7, but would not increase loop length. The relatively low inductance at the loop level could, in a wide number of circumstances, be achieved by the use of low Ur cores slipped over a part of the loop.

Figure 14:
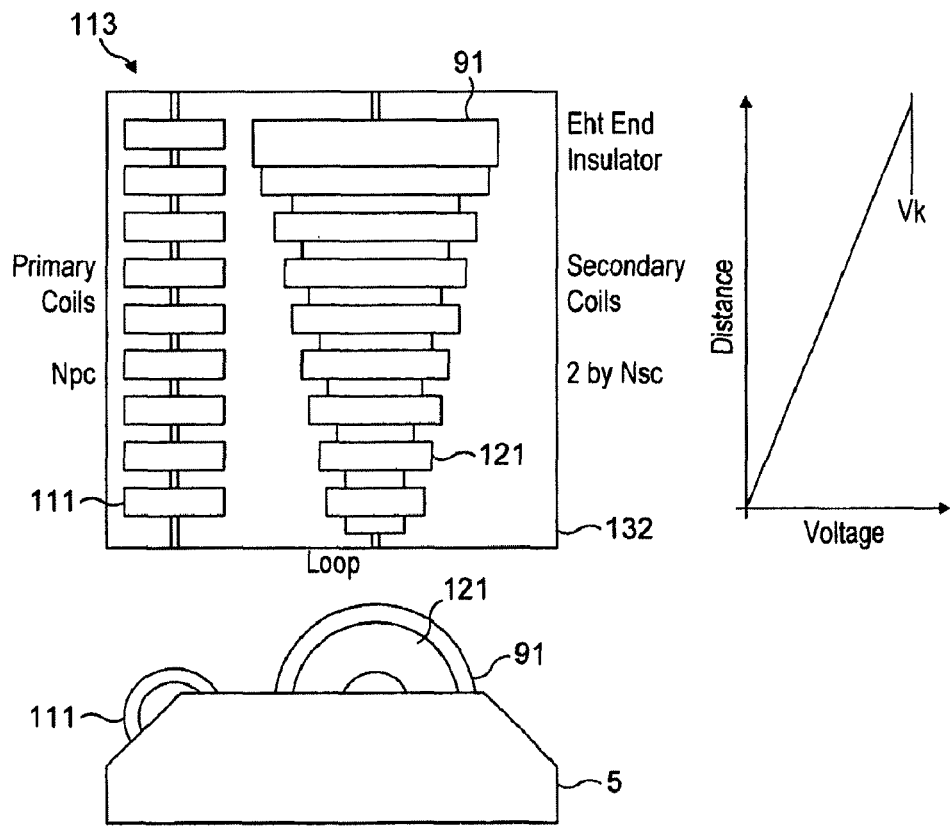
FIG. 14 is a schematic plan and end view of a twelfth embodiment of the invention with a plot of voltage along the secondary windings.

Referring to FIG. 14, in an eleventh embodiment of the invention, any of the preceding embodiments can be adapted to use an arrangement where the secondary coils 121 increase in diameter as the voltage gradient increases, or reduce as the voltage gradient decreases. However, while core loss could be reduced such an embodiment would require manufacture of a larger number of different size coils.

In all of the foregoing non-coaxial embodiments the secondary coils 121 may be directly connected in series or each one may have a rectifier system, as with the coaxial embodiments. This rectifier system may be a bridge or voltage multiplying arrangement if so desired.

Instead of a single tube, the loop 13 may be formed from a number of smaller tubes so that a surface area of the loop is increased thus desirably reducing AC resistance effects.

The primary coils 111 can be arranged in series and/or parallel groupings as required. A convenient concept is to put all the primary coils in parallel and use the same winding as the secondary coils—thus reducing parts variance and increasing the quantities of the coils of a same type which are manufactured by a factor of two.

For higher power complete modules, including control and primary side power electronics, may be paralleled. By timing the triggers to each of the paralleled modules a high ripple frequency may be obtained. Thus higher power systems may be operated with low stored energy and thus avoid the need for an energy diverter, commonly known as a crowbar.

As described, the use of a secondary side smoothing inductor may also be employed. Some embodiments require, and some embodiments may benefit from, this inductor. The inductor is normally referred to as a choke input filter. If such an arrangement is required then the arrangement can be readily adapted into the approach described herein. Each secondary coil and rectifier would have an associated smaller inductor system, these circuit elements would be series connected.

This does not preclude the use instead of a single larger inductor. However, as the frequency is increased a larger inductor may prove challenging to build with adequately low stray capacitance. The use of smaller multiple inductors reduces the dynamic capacitance. The potential quantity build advantage suggested for the coil assemblies equally applies to the output inductors.

One important aspect of an output inductor is that, with certain topologies, the peak voltage can exceed the average output voltage by some significant degree. This makes the eht design more challenging.

Example 1

A transformer was constructed with two magnetic circuits mounted coaxially one inside the other. An outer core TX87/54/14 was wound with 73 turns of ptfe covered 19/0.2 mm silver plated copper wire. The inner core was TN36/23/15 wound with 34 turns of the same wire. The system was interconnected with a fabricated single turn structure using 1 oz/ft² copper clad board and 50 µM copper. The photographs of FIGS. 15 and 16 indicate the assembly technique.

Figure 15:
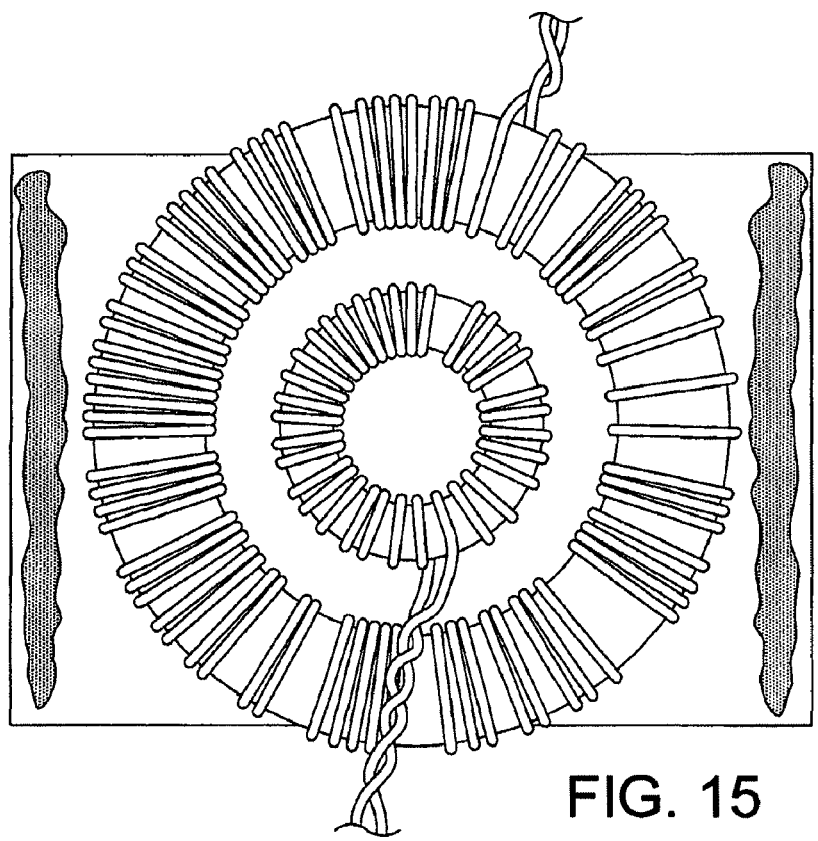
FIG. 15 is a photograph of a test example of a partially assembled transformer according to the invention.
Figure 16:
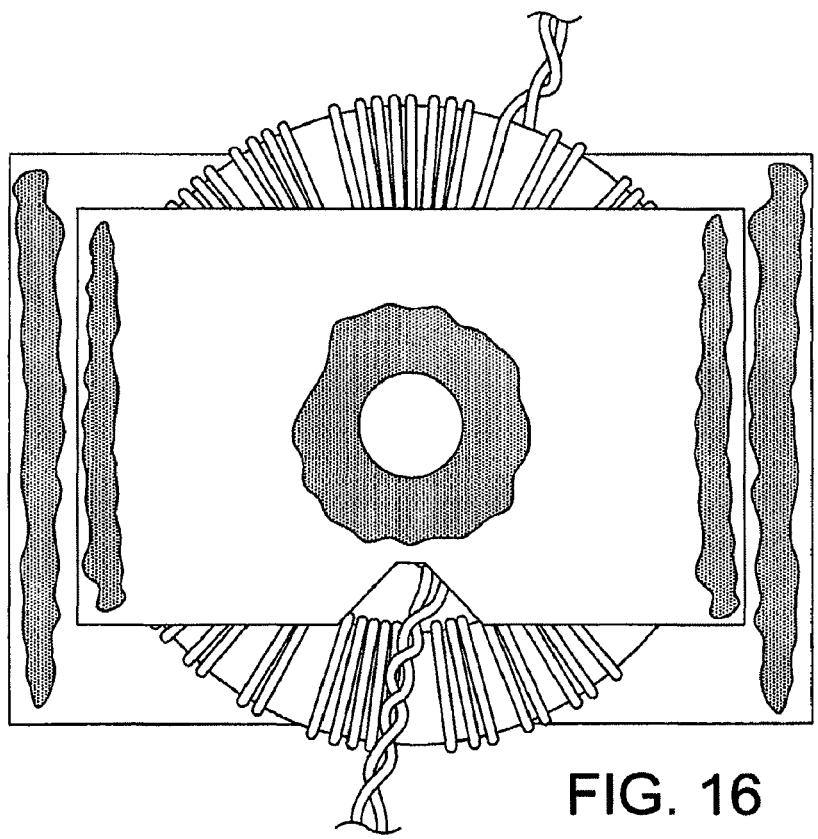
FIG. 16 is a photograph of the test example of FIG. 15 fully assembled.

FIG. 15 shows a location of the cores before final fitting of the single turn coupling system. FIG. 16 shows the final assembly. The unit was tested using low level RF bridges.

At 10 kHz the series inductance and series resistance for each windings were as follows:
Outer Ls=10.23 mH Rs=15.76 R
Inner Ls=2.31 mH Rs=4.41 R The ratio based on square root of the inductance ratio is 2.104, the value based upon the turns is 2.147 which is well within measurement error.

The leakage inductance was checked on one coil with the other coil terminals shorted.

| Frequency | Ls Outer Coil | Rs | Ls Inner Coil | Rs |
|---|---|---|---|---|
| 10 kHz | 50.17 µH | 4.68 R | 10.7 µH | 1.06 R |

The results confirm that mounting the inner coil within the outer coil produces a device that works and that the large radius of the structure results in a construction technique most suited to high voltage applications.

It is also possible to control leakage inductance between primary and secondary by introduction of magnetic material in the space between the inner and outer coil. Thus there could be three separate magnetic circuits mounted concentrically.

If mounted in fluid the construction lends itself to forced convection past the coils by forcing fluid down the center.

The invention claimed is:

1. A transformer comprising:
   a primary winding comprising a first plurality of magnetic circuits each having a second plurality of turns and electrically connected in parallel or powered by a respective power supply;
   a secondary winding comprising a third plurality of magnetic circuits each having a fourth plurality of turns and electrically connected in series; and
   a single turn electrically conductive loop electromagnetically coupling the primary winding to the secondary winding,
   wherein at least one of the magnetic circuits of the secondary winding is provided with a rectifier and a filter to provide a DC output from the transformer,
   wherein at least one of the magnetic circuits of the secondary winding is further provided with an inductive smoothing filter, and
   wherein the inductive smoothing filter for each of the third plurality of magnetic circuits has a common core.

2. A transformer as claimed in claim 1, wherein the primary winding and the secondary winding are coaxial.

3. A transformer as claimed in claim 2, wherein the single turn electrically conductive loop comprises a tube coaxial with the primary winding and the secondary winding.

4. A transformer as claimed in claim 3, wherein the single turn electrically conductive loop further comprises a formed conductive end cheek and a base.

5. A transformer as claimed in claim 4, wherein the formed conductive end cheek is provided with at least one aperture for passing cooling fluid therethrough.

6. A transformer as claimed in claim 1, wherein the inductive smoothing filter comprises a double wound inductor.

7. A transformer as claimed in claim 1, further comprising an inductor in the single turn electrically conductive loop.

8. A transformer as claimed in claim 1, wherein each of the first plurality of magnetic circuits, each of the plurality of second magnetic circuits, the rectifier and the filter are mounted on a respective printed circuit board.

9. A transformer as claimed in claim 8, wherein an inductive smoothing filter is mounted on the respective printed circuit board.

10. A transformer as claimed in claim 1, wherein the primary winding and the secondary winding are in side-by-side relationship.

11. A transformer as claimed in claim 10, wherein the secondary winding further comprises an extra high tension end insulator.

12. A transformer as claimed in claim 10, wherein the secondary winding is arranged in two groups of magnetic circuits such that a secondary voltage is tapped substantially from a centre of the secondary winding between the two groups of magnetic circuits.

13. A transformer as claimed in claim 10, wherein a screen is provided between the primary winding and the secondary winding.

14. A transformer as claimed in claim 10, wherein the smoothing inductive filter cores are provided coaxially with, and internally of, the primary winding.

15. A transformer as claimed in claim 1, wherein at least one of the primary winding and the secondary winding comprises single layer windings.

16. A transformer as claimed in claim 1, wherein the first plurality of magnetic circuits comprises a plurality of toroidal magnetic circuits and the third plurality of magnetic circuits comprises a plurality of toroidal magnetic circuits.

17. A transformer comprising:
a primary winding comprising a first plurality of magnetic circuits each having a second plurality of turns and electrically connected in parallel or powered by a respective power supply;
a secondary winding comprising a third plurality of magnetic circuits each having a fourth plurality of turns and electrically connected in series; and
a single turn electrically conductive loop electromagnetically coupling the primary winding to the secondary winding,
wherein the primary winding and the secondary winding are in side-by-side relationship and wherein the magnetic circuits of the secondary winding are of decreasing diameter from a high voltage end to a low voltage end of the secondary winding.

18. A transformer comprising:
a primary winding comprising a first plurality of magnetic circuits each having a second plurality of turns and electrically connected in parallel or powered by a respective power supply;
a secondary winding comprising a third plurality of magnetic circuits each having a fourth plurality of turns and electrically connected in series; and
a single turn electrically conductive loop electromagnetically coupling the primary winding to the secondary winding;
wherein the primary winding is divided into a first group of magnetic circuits and a second group of magnetic circuits and the first and second group are arranged with their respective axes collinear with an axis of the secondary winding with the first group at a first end of the secondary winding and the second group at a second end of the secondary winding opposed to the first end.

19. A transformer as claimed in claim 18, wherein a return path of the coupling loop is formed of a strip wider than a remaining portion of the coupling loop.

20. A transformer comprising:
a primary winding comprising a first plurality of magnetic circuits each having a second plurality of turns and electrically connected in parallel or powered by a respective power supply;
a secondary winding comprising a third plurality of magnetic circuits each having a fourth plurality of turns and electrically connected in series; and
a single turn electrically conductive loop electromagnetically coupling the primary winding to the secondary winding,
wherein the single turn electrically conductive loop includes an inductor.

21. The transformer of claim 20, wherein the inductor is located between the primary winding and the secondary winding.

22. The transformer of claim 21, wherein the primary winding, the secondary winding, and the inductor are coaxial.

* * * * *